United States Patent [19]

Philipp

[11] 4,451,998
[45] Jun. 5, 1984

[54] FRAME FOR FILM DIAPOSITIVES

[76] Inventor: Hans-J. Philipp, Eichenstrasse 15/17, D-8900 Augsburg 21, Fed. Rep. of Germany

[21] Appl. No.: 367,057

[22] Filed: Apr. 9, 1982

[30] Foreign Application Priority Data

Apr. 10, 1981 [DE] Fed. Rep. of Germany ....... 3114616

[51] Int. Cl.³ ............................................... G09F 1/12
[52] U.S. Cl. ..................................................... 40/152
[58] Field of Search ..................... 40/152, 158, 159, 10

[56] References Cited

U.S. PATENT DOCUMENTS

| | | | |
|---|---|---|---|
| 2,608,776 | 9/1952 | Schuler | 40/618 |
| 3,035,364 | 5/1962 | Hoogesteger | 40/152 |
| 3,069,795 | 12/1962 | Lieberman | 40/152 |
| 3,924,344 | 12/1975 | Davis | 40/17 |
| 3,949,505 | 4/1976 | Kato | 40/152 |
| 3,996,683 | 12/1976 | Hanke | 40/152 X |
| 4,138,787 | 2/1979 | Sarkisian et al. | 40/16 |

FOREIGN PATENT DOCUMENTS 1871398 5/1963 Fed. Rep. of Germany .
40253 7/1965 German Democratic Rep. .

Primary Examiner—Gene Mancene
Assistant Examiner—Wenceslao J. Contreras
Attorney, Agent, or Firm—Armstrong, Nikaido, Marmelstein & Kubovcik

[57] ABSTRACT

The frame 10 consists of one single part and is provided with a rectangular aperture each at its front and rear side the aperture being smaller in size than the covers. Two opposite edges 26, 30 of at least one aperture has a distance which is equal to or slightly larger than the width of the covers 12, 14. Parallel to the two other opposite edges 24, 28 of the aperture, a groove 34, 36 of U-form cross-section extends in the interior of the frame one of the two grooves, for instance 36, being deeper than the other 34. In the proximity of the deeper groove 36 a fixing means 42 is provided.

10 Claims, 3 Drawing Figures

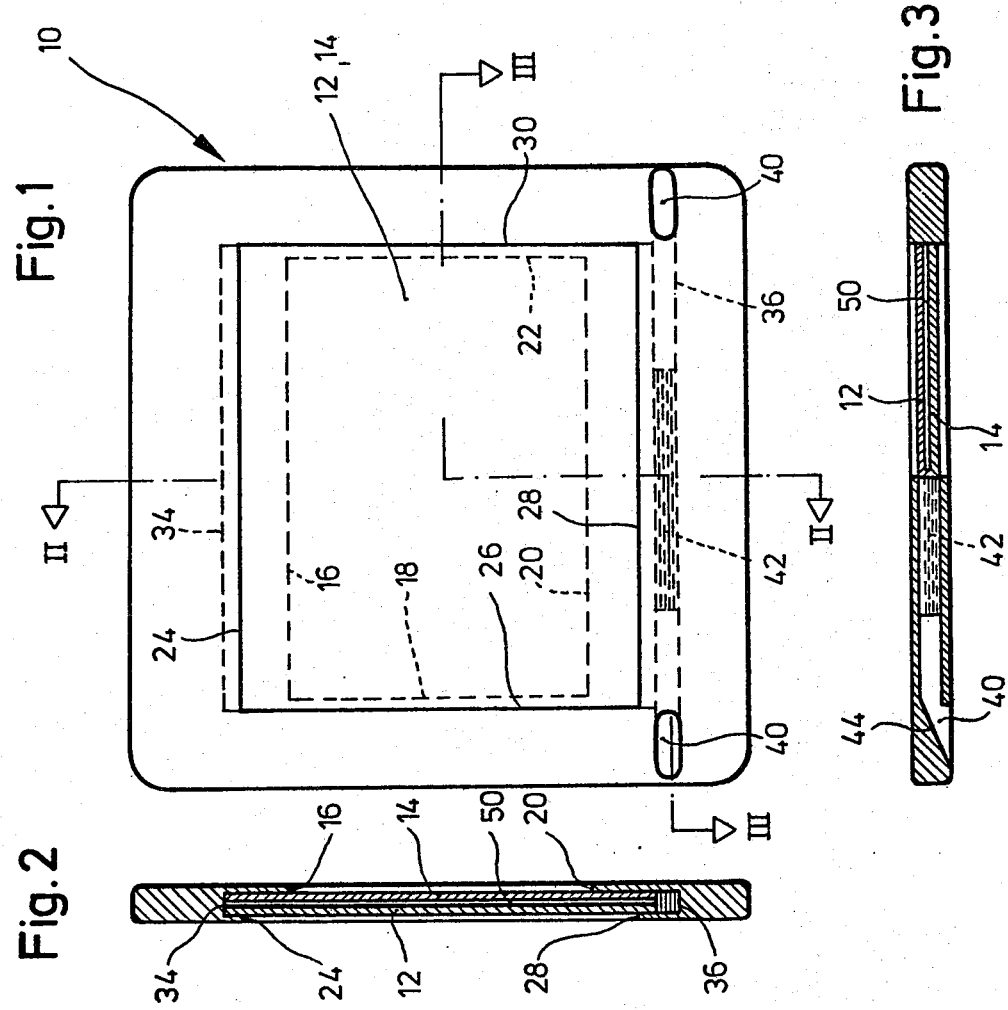

FRAME FOR FILM DIAPOSITIVES

The present invention relates to a frame for film diapositives and in particular to a frame where a film section, i.e. the film diapositive is exchangeable and arranged between two transparent or translucent covers detachably mounted within the frame the latter being provided at its front and rear side with a rectangular aperture smaller in size than the covers means being provided for positioning the covers.

Known frames for instance according to DE-PS No. 12 84 656 consist in general of a frame cover part and a frame base part, the two parts being connected together with their rear edges via a link. At the edge opposite to the link there is a clip keepng the cover part and the base part together and which can be opened for cleaning the frame. The covers are usually mounted at the inner surfaces of the cover part and the base part. The known frames use fixedly mounted glasses. Thus, dust may accumulate in the corners and at the mounting members within the frame cover part and base part which dust is very difficult to remove. When the frames are used in an automatic feeding device of a projector the clip, holding the two parts together, may give rise to jams. Furthermore, when closing the two part frame, it is necessary to bend off the parts which may lead to a breaking of the cover glasses or a misalignment of the film section.

It is an object of the present invention to provide a frame for film diapositives which has a very simple construction.

Another object of the present invention is to provide a frame for film diapositives which very reliable can be used in automatic feeding devices in projectors.

The frame as specified above is according to the invention, characterized in, that the frame consists of one single part, that at least with one of the apertures two parallel opposite edges have a distance which is equal to or slightly larger than the width of the covers, that a groove of approximately U-form cross-section section extends in the interior of the frame parallel to the two other opposite edges of the aperture the distance between the bottoms of the two grooves being larger than the height of the covers one of the two grooves being deeper than the other and that in the proximity of the deeper groove an arresting means is provided which fixedly maintains the covers with their upper and lower edges within the grooves.

In view of the unitary construction of the frame the casting mold for producing the frame may have a very simple form; also, there is no need for assembling the cover and base part. Since no clip is provided the frame is no more subject to distortion or twisting and there is no danger for a transportation jam.

Further features and advantages of the frame according to the invention will be more apparent from the following description of an embodiment under reference to the drawing, wherein FIG. 1 shows a plane view of a preferred embodiment of the frame according to the invention, FIG. 2 is a cross-sectional view taken along the line II—II of the frame according to FIG. 1, and FIG. 3 is a cross-sectional view of the frame according to FIG. 1 taken along the lines III—III.

The figures show a unitary frame 10 being provided at its front and rear surface with a window-like aperture; each of the two apertures are defined by the edges 24, 26, 28 and 30 as well as 16, 18, 20 and 22 respectively. The two apertures may have the same form or size respectively; preferably one of the apertures is smaller than the other. Two opposite parallel edges, i.e. 26 and 30 of at least one of the apertures has a distance which is equal to or slightly larger than the width of the covers, for instance glasses 12, 14; between them the film section or diapositive 50 may be arranged.

Parallel to the other two opposite parallel edges 24, 28, a groove 34 and 36 respectively extends in the interior of the frame the grooves having an approximately U-form cross-section and the distance between the bottoms of the two grooves 34 and 36 is larger than the height of the covers 12, 14. One of the two grooves with the specific embodiment the groove 36 is deeper than the other groove 34. The height of the glasses 12, 14 is such that the covers may be first moved into the deeper groove 36 and then passing the opposite edge 24 moved into the height of the grooves 34. The height of the glasses preferably corresponds approximately to the height of the diapositive 50. The width of the grooves 34, 36 correspond to the total of the thickness of the two glasses 12, 14 plus the thickness of the diapositive 50. Preferably the inner upper edges of the grooves are phased, alternatively the inner surfaces of the vertical walls of the grooves are sloped outwardly at least at their upper halves. Such a shape is particularly useful for groove 34 whilst for groove 36 the sloping or phasing is provided at the utmost upper end only in order to safely secure the covers 12, 14 after insertion.

The frame is completed to a transparency or slide as follows: First, the diapositive is placed between the two covers 12, 14; here it is very simple to position since it has the same height as the covers 12, 14. In a next step this package is inserted approximately down to the bottom of the groove 36. In this position the package can be aligned with the other groove 34 into which it is then shifted. Now the package consisting of the covers 12, 14 and the diapositive 50 is fixed in position in a manner for which various alternatives are given below.

For a first embodiment the deeper groove 36 is extended at least to one preferably in both directions outwardly to an opening 40 provided at the frame surface. Each opening 40 is connected with the front or rear surface respectively of the frame via a slope 44. Alternatively, the groove 36 can be extended straight to the edge surfaces of the frame.

After the covers and the diapositive 50 having been inserted into the groove 34 and are in contact with its bottom, a fixing means is entered via the opening for instance 40 which fixing means for example comprises a cord or wire of synthetic or metallic material. The cross-section of the fixing means can be circular or polygonic and corresponds to the cross-section of the openings 40 and the groove 36 respectively. The length of the cord 42 is such that after inserting, its ends do not project over the surface of the frame. During the framing process, pieces of cord 42 can be cut off from a cord supply roll. The end of the cord supply roll may be used for inserting the cut off cord piece 42 deeply into the groove 36. The cord piece 42 is easily removable in that another cord piece is used for moving it within the groove until the end of the inserted cord may be gripped at the surface of the frame. Since the cord piece 42 is completely located within the frame, there is no projecting of edges or parts which may result in the frame getting stuck during automatic feeding. In view of the tension free fixing of the covers and the diapositive, the surfaces of the frame are completely plane and parallel.

Beside this preferred embodiment of the fixing means there are further alternatives. Thus, holes could be provided in the proximity of the groove 36 vertical therto; into the holes studs could be inserted provided with a flat head which studs may be impressed like a snap fastener.

In a simplyfied embodiment of the frame according to the invention, the groove 36 could be omitted. In this case, the distance between the edge 28 to the bottom of groove 34 may be such that it corresponds to the height of the covers 12, 14. For framing the package consisting of the covers 12, 14 and the diapositive 50 would be inserted up to the bottom of groove 34, whilst the opposite edge of the package abuts against the edge 28. In this case, the fixing may be accomplished by projection lips or the like provided at the edge 28 or the edges 26 and 30 adjacent the edge 28. The package would then be pressed behind such projections. Of course, the projections should be plane with the surface of the frame. Alternatively, the fixing via snap fasteners, as mentioned above, using a flat head projecting over the edge 28 could be used the head being sunk into the frame. Furthermore, the fixing could be accomplished by a kind of bolt which is rockable or shiftably secured to the frame part defined by the edge 28.

For using the frame 10 in a carousell magazine it may be of advantage to taper the frame at least at one side preferably, however, on all sides in the direction of the circumference.

I claim:

1. A frame for film diapositives held between two transparent or translucent covers which are not fixedly mounted in the frame, the frame being provided with an rectangular aperture each at its front and rear side therethrough, the aperture being smaller in size than the covers, and means being provided for securely positioning the covers, characterized in that the frame consists of one single part, that a distance between two opposite parallel edges of at least one of the aperture is equal to or slightly larger than the width of the covers, that a groove each of U-form cross-section extends in parallel to the other two opposite edges of the aperture within the frame, the distance between the bottoms of the two grooves being larger than the height of the covers with one of the two grooves being deeper than the other and that said means for positioning comprises a separate fixing member in the proximity of the deeper groove pressing against an edge of at least one of the covers securely positioning the covers in the frame and with their upper and lower edges within both of the grooves, and the deeper groove extends at least in one direction to at least one opening provided at the frame surface, said at least one opening being sized to receive said separate fixing member.

2. A frame according to claim 1, characterized in that one of the apertures is smaller in size than the other.

3. A frame according to claim 1, characterized in that the at least one opening is provided at the front or rear surface of the frame respectively and is connected to the deeper groove via a slope.

4. A frame according to claim 3 characterized in that the fixing member comprises a cord or wire like piece of synthetic or metallic material inserted through said at least one opening the length of said piece being such that in the inserted condition the piece does not project out of the at least one opening.

5. A frame according to claim 1, characterized in that said deeper groove extends to two openings formed as straight continuations of the deeper groove to the edge faces of the frame.

6. A frame according to claim 5 characterized in that the fixing member comprises a cord or wire like piece of synthetic or metallic material inserted through said at least one opening the length of said piece being such that in the inserted condition the piece does not project out of the at least one opening.

7. A frame according to claim 1, characterized in that the fixing member comprises a cord or wire like piece of synthetic or metallic material inserted through said at least one opening the length of said piece being such that in the inserted condition the piece does not project out of the at least one opening.

8. A frame according to claim 1, characterized in that the surfaces of the frame are tapered towards the circumference at least at one side.

9. A frame according to claim 1, characterized in that the inner edges of a least one groove are phased or the inner surfaces of the grooves are partially sloped in outward direction.

10. A frame for film diapositives held between two transparent or translucent covers which are not fixedly mounted in the frame, the frame being provided with a rectangular aperture each at its front and rear side therethrough, the aperture being smaller in size than the covers, and means being provided for securely positioning the covers, characterized in that the frame consists of one single part, that a distance between two opposite parallel edges of at least one of the apertures is equal to or slightly larger than the width of the covers, that a groove each of U-form cross-section extends in parallel to the two opposite edges of the aperture within the frame, the distance between the bottoms of the two grooves being larger than the height of the covers with one of the two grooves being deeper than the other, and that said means for positioning comprises at least one hole extending to the deeper groove vertically thereto, and a stud provided with a flat head being impressible like a snap-fastener into the hole pressing against an edge of at least one of the covers securely positioning the covers in the frame with their upper and lower edges within both of the grooves.

* * * * *